(12) United States Patent
Karaffa et al.

(10) Patent No.: US 8,994,545 B2
(45) Date of Patent: Mar. 31, 2015

(54) SYSTEMS AND METHODS FOR ALERT DEVICE REMOVAL

(75) Inventors: John Michael Karaffa, Roanoke, VA (US); Johnny Stephen Downor, Salem, VA (US); Steven William Smith, Roanoke, VA (US); William Robert Pettigrew, Christiansburg, VA (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 13/149,706

(22) Filed: May 31, 2011

(65) Prior Publication Data

US 2012/0306658 A1    Dec. 6, 2012

(51) Int. Cl.
*G07C 3/00*    (2006.01)
*G05B 19/418*    (2006.01)

(52) U.S. Cl.
CPC .. *G05B 19/4186* (2013.01); *G05B 2219/25206* (2013.01); *G05B 2219/31369* (2013.01); *G05B 2219/33151* (2013.01)
USPC .......................................................... 340/679

(58) Field of Classification Search
CPC ...................................................... G07C 3/00
USPC ......... 340/511, 572.1, 657, 658, 679, 870.02; 340/870.05; 700/8, 9, 20, 21, 276, 296; 713/502; 709/224; 715/734; 702/187–188
See application file for complete search history.

(56) References Cited

U.S. PATENT DOCUMENTS

| | | | |
|---|---|---|---|
| 6,915,364 B1 | 7/2005 | Christensen et al. | |
| 7,068,184 B2* | 6/2006 | Yee et al. | 340/870.05 |
| 7,146,230 B2 | 12/2006 | Glanzer et al. | |
| 7,191,076 B2* | 3/2007 | Huber et al. | 702/62 |
| 7,272,457 B2 | 9/2007 | Glanzer et al. | |
| 7,468,731 B2 | 12/2008 | Eldridge et al. | |
| 7,478,333 B2 | 1/2009 | Shah et al. | |
| 7,478,337 B2 | 1/2009 | Kodosky et al. | |
| 7,480,906 B2 | 1/2009 | Joffrain et al. | |
| 7,568,017 B2 | 7/2009 | Shah et al. | |
| 7,579,947 B2* | 8/2009 | Peluso | 340/539.26 |
| 7,594,220 B2 | 9/2009 | Kodosky et al. | |
| 7,594,226 B2 | 9/2009 | Stetzer et al. | |
| 7,610,354 B2 | 10/2009 | Adams et al. | |
| 7,620,897 B2 | 11/2009 | Shah et al. | |

(Continued)

FOREIGN PATENT DOCUMENTS

| | | |
|---|---|---|
| EP | 1612630 A1 | 1/2006 |
| WO | WO 03019304 | 3/2003 |
| WO | 2011042257 A2 | 4/2011 |

OTHER PUBLICATIONS

U.S. Appl. No. 13/149,789, filed May 31, 2011, Karaffa et al.

(Continued)

*Primary Examiner* — Hai Phan
*Assistant Examiner* — Zhen Y Wu
(74) *Attorney, Agent, or Firm* — Fletcher Yoder, P.C.

(57) ABSTRACT

The embodiments described herein include systems and methods for removal of alerts for a device. In one embodiment, an industrial process control system includes a controller a controller coupled to a field device. The industrial process control system further includes an alert server coupled to the controller. The controller is configured to detect, via a first protocol, removal of the field device and to communicate, in a second protocol, the removal of the field device to the alert server.

13 Claims, 4 Drawing Sheets

(56) References Cited

U.S. PATENT DOCUMENTS

| | | | |
|---|---|---|---|
| 7,627,860 B2 | 12/2009 | Kodosky et al. | |
| 7,702,487 B2 | 4/2010 | Sherrill et al. | |
| 7,725,356 B2 | 5/2010 | Shah et al. | |
| 7,729,887 B2 | 6/2010 | Sherrill et al. | |
| 7,761,802 B2 | 7/2010 | Shah et al. | |
| 8,260,736 B1* | 9/2012 | Lear et al. | 706/46 |
| 2002/0055790 A1 | 5/2002 | Havekost | |
| 2002/0183864 A1* | 12/2002 | Apel et al. | 700/14 |
| 2003/0004987 A1 | 1/2003 | Glanzer et al. | |
| 2003/0023795 A1 | 1/2003 | Packwood et al. | |
| 2003/0200323 A1 | 10/2003 | Dold et al. | |
| 2005/0007249 A1* | 1/2005 | Eryurek et al. | 340/511 |
| 2005/0228509 A1 | 10/2005 | James | |
| 2006/0181427 A1* | 8/2006 | Bouse et al. | 340/657 |
| 2006/0253570 A1* | 11/2006 | Biswas et al. | 709/224 |
| 2006/0259159 A1* | 11/2006 | Zielinski | 700/19 |
| 2007/0079250 A1 | 4/2007 | Bump et al. | |
| 2007/0124253 A1* | 5/2007 | Angerame et al. | 705/63 |
| 2007/0129820 A1* | 6/2007 | Glanzer et al. | 700/20 |
| 2007/0250180 A1 | 10/2007 | Bump et al. | |
| 2007/0280287 A1* | 12/2007 | Samudrala et al. | 370/466 |
| 2008/0004727 A1* | 1/2008 | Glanzer et al. | 700/83 |
| 2008/0141170 A1 | 6/2008 | Kodosky et al. | |
| 2008/0141174 A1 | 6/2008 | Kodosky et al. | |
| 2008/0238713 A1* | 10/2008 | Banhegyesi et al. | 340/870.02 |
| 2008/0255782 A1* | 10/2008 | Bilac et al. | 702/62 |
| 2009/0066515 A1* | 3/2009 | Kangas | 340/572.1 |
| 2009/0132940 A1 | 5/2009 | Joffrain et al. | |
| 2009/0259972 A1 | 10/2009 | Kodosky et al. | |
| 2009/0287789 A1* | 11/2009 | Dolan et al. | 709/208 |
| 2009/0287914 A1 | 11/2009 | Shah et al. | |
| 2010/0005425 A1 | 1/2010 | Kodosky et al. | |
| 2010/0011311 A1 | 1/2010 | Kodosky et al. | |
| 2010/0058188 A1 | 3/2010 | Shah et al. | |
| 2010/0107007 A1* | 4/2010 | Grohman et al. | 714/15 |
| 2011/0054699 A1* | 3/2011 | Imes et al. | 700/276 |
| 2012/0084431 A1* | 4/2012 | Syed et al. | 709/224 |

OTHER PUBLICATIONS

U.S. Appl. No. 13/149,816, filed May 31, 2011, Karaffa et al.
U.S. Appl. No. 13/149,826, filed May 31, 2011, Karaffa et al.
U.S. Appl. No. 13/149,833, filed May 31, 2011, Karaffa et al.
U.S. Appl. No. 13/149,803, filed May 31, 2011, Karaffa et al.
U.S. Appl. No. 13/149,764, filed May 31, 2011, Karaffa et al.
U.S. Appl. No. 13/149,597, filed May 31, 2011, Karaffa et al.
U.S. Appl. No. 13/149,660, filed May 31, 2011, Karaffa et al.
U.S. Appl. No. 13/149,746, filed May 31, 2011, Karaffa et al.
U.S. Appl. No. 13/149,811, filed May 31, 2011, Karaffa et al.
U.S. Appl. No. 13/040,917, filed Mar. 4, 2011, Nekkar et al.
U.S. Appl. No. 13/103,864, filed May 9, 2011, Ojha et al.
U.S. Appl. No. 13/106,741, filed May 12, 2011, Ojha et al.
Search Report and Written Opinion from corresponding EP Application No. 12168620.8-1807 dated May 8, 2013.
U.S. Appl. No. 13/149,660, filed May 31, 2011, John Michael Karaffa, et al.
http://www.fieldbusinc.com/downloads/primer1_1.pdf ; Fieldbus, Inc.; The Foundation™ Fieldbus Primer; Revision 1.1, Jun. 24, 2011, 36 pages.
http://zone.nl.com/devzone/cda/tut/p/id/3345; National Instruments; Fieldbus Parameters; Dec. 7, 2006.

* cited by examiner

SYSTEMS AND METHODS FOR ALERT DEVICE REMOVAL

BACKGROUND OF THE INVENTION

The subject matter disclosed herein relates to the removal of devices, and more specifically, to the removal of alert devices.

Certain systems, such as industrial control systems, may provide for control capabilities that enable the execution of computer instructions in various types of devices, such as sensors, pumps, valves, and the like. For example, a communications bus may be used to send and receive signals to the various devices. Each device may issue alerts related to the device conditions and control logic and transmit them over the communications bus. The alert information may be received by a number of interested entities, including alert viewers. However, the removal of such devices may present challenges in managing the alert information.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an industrial process control system includes a controller configured to couple to a field device. The industrial process control system further includes an alert server configured to couple to the controller. The controller is configured to detect, via a first protocol, removal of the field device and to communicate, in a second protocol, the removal of the field device to the alert server.

In a second embodiment, a method includes detecting, via a controller of an industrial control system and a first protocol, a detachment of a field device. The method also includes removing alert information relating to the field device from an alarm data manager. The method further includes reporting, via the controller and a second protocol, the detachment of the field device to components of the industrial control system.

In a third embodiment, a non-transitory tangible computer-readable medium including executable code is provided. The executable code includes instructions for detecting, via a controller of an industrial control system and a first protocol, a detachment of a field device. The executable code also includes instructions for removing alert information relating to the field device from an alarm data manager. The executable code further includes instructions for reporting, via the controller and a second protocol, the detachment of the field device to components of the industrial control system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial control systems may include controller systems suitable for interfacing with a variety of field devices, such as sensors, pumps, valves, and the like. For example, sensors may provide inputs to the controller system, and the controller system may then derive certain actions in response to the inputs, such as actuating the valves, driving the pumps, and so on. In certain controller systems, such as the Mark™ VIe controller system, available from General Electric Co., of Schenectady, N.Y., multiple field devices may be communicatively coupled to and controlled by a controller. Indeed, multiple controllers may be controlling multiple field devices, as described in more detail with respect to FIG. 1 below. The devices communicatively connected to the controller may include field devices, such as Fieldbus Foundation devices, that include support for the Foundation H1 bi-directional communications protocol. Accordingly, the devices may be communicatively connected with the controller in various communication segments, such as H1 segments, attached to linking devices, to enable a plant-wide network of devices.

Each field device may include computer instructions or control logic encapsulated in function blocks. For example, a proportional-integral-derivative (PID) function block may include PID instructions suitable for implementing a closed-loop control of certain processes, such as industrial processes. Likewise, an Analog Input (AI) function block and an Analog Output (AO) function block may be used to retrieve input data and to submit output data, respectively. Indeed, various types of function blocks may be provided that can include a variety of computer instructions or control logic, as described in more detail below with respect to FIG. 1. The field device may then execute the computer instructions or control logic in the function block. Different types of alerts, such as alarms and events, may be included in each function block, as described in more detail below with respect to FIG. 3. Thus, the field devices may issue a variety of alarms and events related to execution of the function blocks as well as to diagnostic conditions of the field devices. As referred to herein, the term "alerts" includes both alarms and events.

Generally, as used herein, an "alarm" refers to a condition that may include acknowledgment by a human operator, while an "event" refers to a condition that may include automatic acknowledgment. Alarms may further include diagnostic alarms and process alarms. Process alarms generally include conditions (e.g., alarm limits) that a user may define, useful in enabling an alert notification once the condition occurs. For example, a rising edge transition of a Boolean variable may be defined by the user in a control loop. A value rising above an edge value (e.g., 100) may then trigger an alert notification based on this process alarm. Diagnostic alarms generally include pre-determined conditions that may not be user defined. For example, a manufacturer may include a pre-determined operating temperature range for a device, and temperature values outside of the desired temperature range may trigger an alert notification based on the diagnostic alarm.

Once the field devices are attached and commissioned (i.e., configured to communicate with other entities in a network), the field devices may provide a variety of alert information (e.g., alarm and event information) to interested entities. For example, alarm viewers, redundant (i.e., backup) controllers, and others may receive alert information. However, removal of the field devices from the network may result in inconsistent alert information. For example, a forklift operator may inadvertently knock off and disconnect a field device from the network. A user viewing alerts related to the removed field device may still see the alert information and may make process control decisions based on outdated information. Additionally, the user may attempt to interact with the alert, such as by trying to acknowledge the alert, yet the acknowledgement may not be properly processed due to the disconnection of the field device.

Embodiments described herein enable the removal of the field device and corresponding alert information. That is, once the field device is removed, any corresponding alert information may also be automatically removed or updated to reflect that the field device is no longer present. Such a "plug and play" approach enables clients to be notified once the field device is removed from the industrial control system. Further, this "plug and play" approach may minimize or eliminate human involvement during the removal of alert information related to the detached device. In one embodiment, a live list of field devices may be maintained that lists all the devices currently attached to the industrial automation system. The removal of the device from the industrial control system may update the live list by deleting the device from the live list. The updated live list may then be used, for example, by an alarm process executing in a main controller, to distribute notifications of the removal of the device and any corresponding alert information. Additionally, the alarm process may be used as a centralized repository of alarm information, thus maintaining alarm information consistent across the industrial control system. Redundant controllers may also be employed to provide failover capabilities. Should the main controller become inoperative, a redundant controller may become a new main controller, thus providing for failover protection and redundant operations.

The alert viewers or clients may include clients communicating in a protocol different than the protocol used by the field devices. For example, the field devices may use a Fieldbus Foundation communications protocol, while the alert clients may use a serial data interface (SDI) communications protocol. Indeed, the systems and methods disclosed herein enable a harvesting of alert information from field devices suitable for use in a variety of alert clients, including alert clients communicating in a variety of protocols. In this manner, alert information for a variety of field devices may be maintained in a consistent state, even when a field device is removed.

Figure 1:
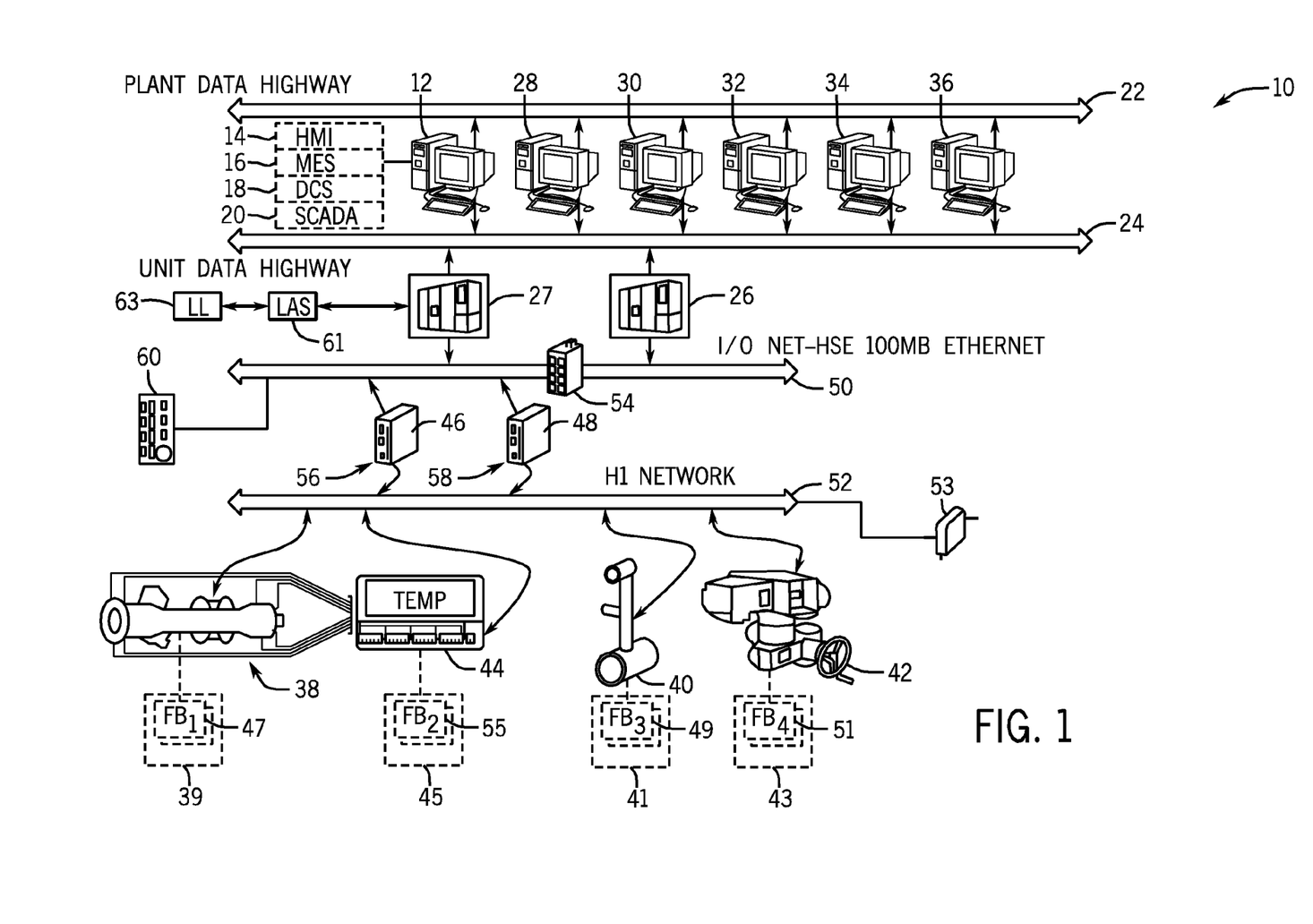
FIG. 1 is a schematic diagram of an embodiment of an industrial control system, including a communications bus.

With the foregoing in mind, FIG. 1 depicts an embodiment of an industrial process control system 10. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectday, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26 and 27. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. Other computers coupled to the plant data highway 22 and/or the unit data highway 24 may include computers hosting Cimplicity™, ControlST™, and ToolboxST™, available from General Electric Co., of Schenectady, N.Y.

The system 10 may include any number and suitable configuration of industrial controllers 26 and 27. For example, in some embodiments the system 10 may include one industrial controller 26, or two (e.g., 26 and 27), three, or more industrial controllers 26 for redundancy. The industrial controllers 26 and 27 may enable control logic useful in automating a variety of plant equipment, such as a turbine system 38, a valve 40, and a pump 42. Indeed, the industrial controllers 26 and 27 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller may further communicate with electric actuators, switches (e.g., Hall switches, solenoid switches, relay switches, limit switches), and so forth.

Each field device 38, 40, 42, and 44 may include a respective device description (DD) file, such as the depicted DD files 39, 41, 43, and 45. The DD files 39, 41, 43, and 45 may be written in a device description language (DDL), such as the DDL defined in the International Electrotechnical Commission (IEC) 61804 standard. In some embodiments, the files 39, 41, 43, and 45 are tokenized binary files. That is, the DD files 39, 41, 43, and 45 may include data formatted in a tokenized binary format useful in reducing the size of the DD files 39, 41, 43, and 45. The DD files 39, 41, 43, and 45 may each include one or more function blocks 47, 49, 51, and 55. The function blocks 47, 49, 51, and 55 may include computer instructions or computer logic executable by processors. In this way, the field devices 38, 40, 42, and 44 may contribute control logic and other computer instructions towards the execution of processes in the industrial process control system 10.

In the depicted embodiment, the turbine system 38, the valve 40, the pump 42, and the temperature sensor 44 are communicatively interlinked to the automation controller 26 and 27 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as the industrial controllers 26 and 27, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52. Accordingly, a variety of devices may be linked to the industrial controllers 26, 27 and to the computer 12. For example, the devices, such as the turbine system 38, the valve 40, the pump 42, and the temperature sensor 44, may include industrial devices, such as Fieldbus Foundation devices that include support for the Foundation H1 bi-directional communications protocol. In such an embodiment, a Fieldbus Foundation power supply 53, such as a Phoenix Contact Fieldbus Power Supply available from Phoenix Contact of Middletown, Pa., may also be coupled to the H1 network 52 and may be coupled to a power source, such as AC or DC power. The power supply 53 may be suitable for providing power to the devices 38, 40, 42, and 44, as well as for enabling communications between the devices 38, 40, 42, and 44. Advantageously, the H1 network 52 may carry both power and communications signals (e.g., alert signals) over the same wiring, with minimal communicative interference. The devices 38, 40, 42, and 44 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50. The I/O pack 60 may provide for the attachment of additional sensors and actuators to the system 10. The linking devices 46 and 48 may also provide additional functionality, such as maintaining a link active scheduler (LAS) 61 and a live list 63 of field devices 38, 40, 42, and 44, as described in more detail below with respect to FIG. 2. The live list 63 may be stored on a memory of the linking devices 46 and 48. The live list 63 includes the list of all devices currently communicatively coupled to the system 10.

Figure 2:
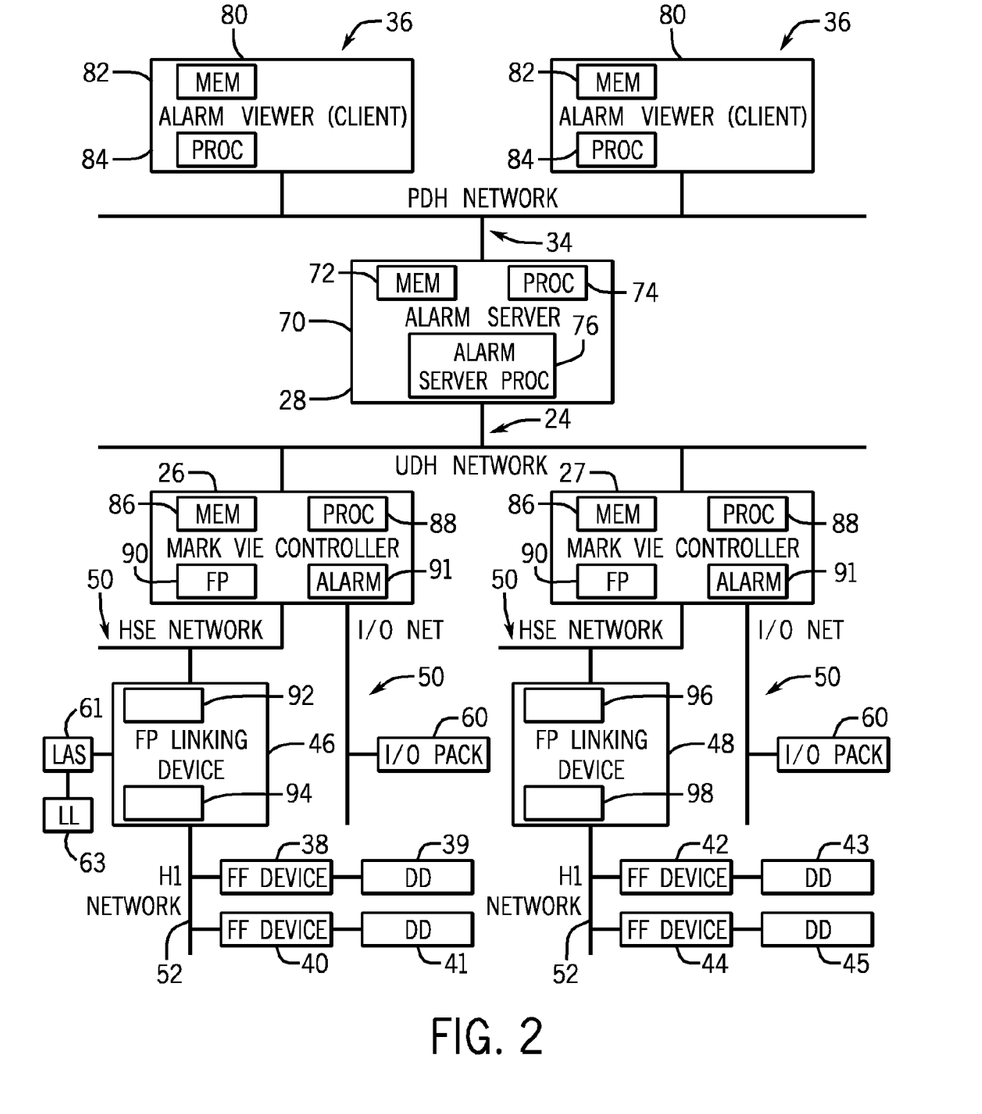
FIG. 2 is a block diagram including embodiments of various components of the industrial control system of FIG. 1.

In certain embodiments, the devices 38, 40, 42, and 44 may provide data, such as alerts, to the system 10. These alerts may be handled in accordance with the embodiments described below. FIG. 2 depicts a block diagram of an embodiment of the industrial process control system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm server process 76 for receiving, processing, and responding to alarms received from the controllers 26 and 27. Multiple controllers, such as the controllers 26 and 27, may be set up for redundant operations. That is, should the controllers 26 become inoperative, the controller 27 may take over and continue operations.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 and 27 are coupled to the unit data highway 24, and the controllers 26 and 27 may communicate with the alarm server 70 over the unit data highway 24. For example, in one embodiment, the controllers 26, 27, and alarm server 70 may communicate using the SDI alarm protocol. The controllers 26 and 27 may each include a memory 86 and a processor 88 for executing the functions of the controllers 26 and 27. In one embodiment, the controllers 26 and 27 may execute a Fieldbus process 90 and an alarm process 91. The Fieldbus process 90 may be used to interface with the field devices 38, 40, 42, and 44 while the alarm process 91 may be used to provide for a centralized facility suitable for distributing alarm information, as described in more detail with respect to FIG. 3. Alert and function block information may be included in the DD files 39, 41, 43, and 45 corresponding to each filed device 38, 40, 42, and 44, respectively. As mentioned above, the controllers 26 and 27 may be coupled to the I/O pack 60 over the I/O NET 50. In one embodiment, the I/O pack 60 may communicate with the controllers 26 and 27 using the advanced digital logic (ADL) protocol.

As also described above, the controllers 26 and 27 may be coupled to linking devices 46 and 48 through an I/O NET 50. The linking devices 46 and 48 may communicate with the controllers 26 and 27 over the I/O NET 50. The linking devices 46 and 48 may be coupled to the H1 network 52, and one linking device 46 may be coupled to devices 38 and 44 and another linking device 48 may be coupled to device 40 and 42. The linking device 46 may include a memory 92, such as volatile and non-volatile memory, and the processor 94, and the linking device 48 may include a memory 96, such as volatile and non-volatile memory, and a processor 98. In one embodiment, the linking devices 46 and 48 may communicate with the controllers 26 and 27 using the Fieldbus Foundation protocol.

A master linking device, such as the linking device 46, may include a LAS 61. The LAS 61 may schedule the execution of the function blocks 47, 49, 51, and 55 shown in FIG. 1 as part of the management of the macrocycle. Additionally, the LAS 61 may periodically issue a token, such as a pass token, to each of the field devices 38, 40, 42, and 44. The field devices 38, 40, 42, and 44 that properly respond to the pass token may be kept in the live list 63. Any field device 38, 40, 42, and 44 not responding to the pass token may be removed from the live list 63. In this manner, the live list 63 is kept updated by maintaining a list of communicatively responsive field devices 38, 40, 42, and 44. In one embodiment, the live list 63 may be advantageously used to maintain consistency of alert information, even in circumstances where one or more of the field devices 38, 40, 42, and 44 may have been disconnected, as described in more detail below with respect to FIG. 5.

Figure 3:
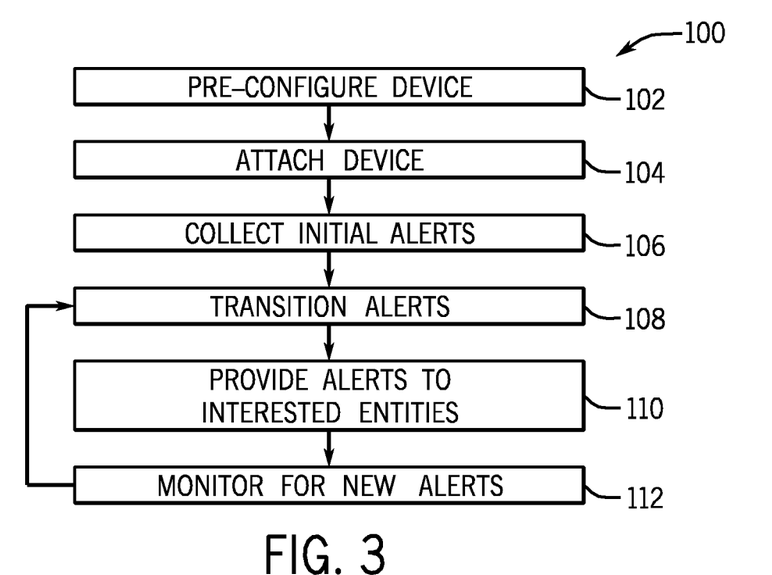
FIG. 3 is a flow chart of an embodiment of a process useful in collecting and transferring alert information.

The industrial automation system 10 may enable alarm and diagnostic information to be communicated from the various devices to a user, such as through the HMI 14 and the alarm viewers 80, as described in more detail below with respect to FIG. 3. For example, alarm and diagnostic information in a first format (e.g., Fieldbus Foundation protocol), may be received by the controller 26 and forwarded to the alarm server 70 in a second format (e.g., SDI protocol). By translating the alert information as necessary and by providing a common distribution service for alert information, the controller 26 may enable the efficient use of a variety of devices communicating in different protocols. Additionally, the controllers 26 and 27 may provide for redundant operations, thus maintaining alert information in the event of downtime by one or more controllers 26 and 27.

Figure 4:
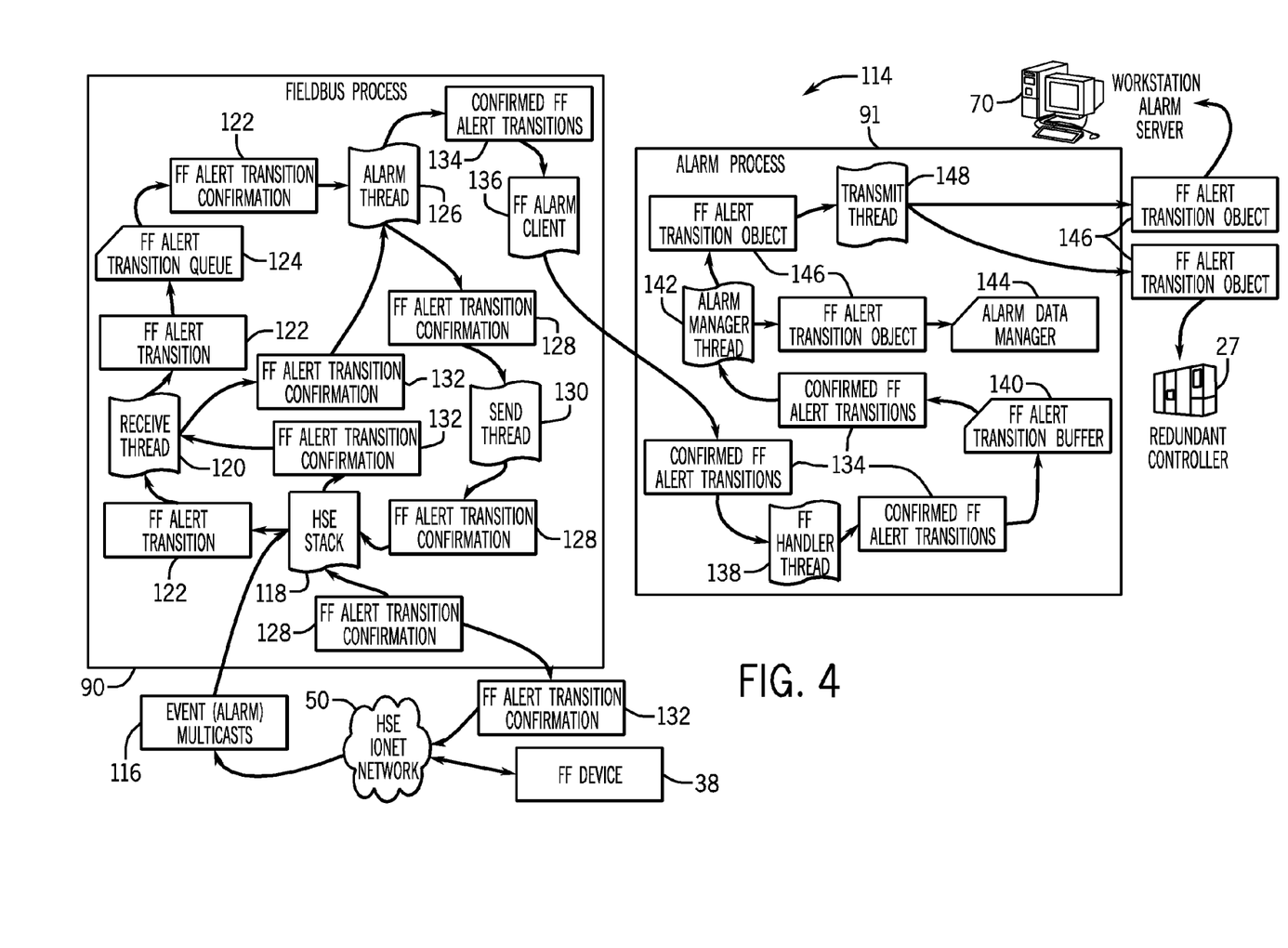
FIG. 4 is an information flow diagram of an embodiment of a Fieldbus process and an alarm process.

It may be useful to describe an embodiment of a process used for capturing and distributing alert information in order to better describe a process suitable for maintaining consistency of alert information upon removal of a field device. Accordingly, FIGS. 3 and 4 depict capturing and distributing alert information in accordance with an embodiment of the present invention. More specifically, FIG. 3 is a flow chart depicting an embodiment of a process 100 useful in capturing alert information and continuously providing the information to the alarm server 70 and the alarm viewers 80, as well as redundant controller 26 shown in FIG. 2. The process 100 may be implemented as executable code instructions stored on a non-transitory tangible computer-readable medium, such as the memory 86 of the controller 26, the memory of the controller 27, and the memory 72 of the alarm server 70. A field device, such as any of the field devices 38, 40, 42, and 44 shown in FIGS. 1 and 2, may first be pre-configured (block 102) with function block and alert information. For example, the HMI 14, MES 16, DCS 18, and SCADA 20 may be used to provide one or more screens suitable for pre-configuring the field device 38 to provide for a desired control logic and alert information behavior. In one embodiment, the DD file 39 corresponding to the field device 38 may be used to retrieve device configuration information, such as alert information. For example, the DD file 39 may include information such as function blocks associated with the field device 38, alerts corresponding to each function block, and alerts corresponding to the device 38 (e.g., diagnostic alarms).

A device placeholder (e.g., virtual device) may then be presented by the pre-configuration screen and selected by a user (e.g., control engineer, commissioning engineer) to enter configuration information related to the device. The configuration information read from the DD file 39 may include alert information that may include undefined alerts, low limit alarms (LO), high limit alarms (HI), critical low limit alarms (LO LO), critical high limit alarms (HI HI), deviation low alarms (DV LO), deviation high alarms (DV HI), discrete alarms (DISC), block alarms (BLOCK), write protect changed alarm (WRITE), static data update event, link associated with function block update event, trend associated with block update event, ignore bit string update event (IGNORE), integrator reset update event (RESET), or any other suitable alert parameters or other information. The user may pre-configure the alerts, for example, by assigning alert limit values, acknowledgement options (e.g., automatic acknowledgement of the alert, manual acknowledgement of the alert), alarm hysteresis (i.e., amount a process value must return within the alarm limit before an alarm condition clears), alert key (i.e., value used in sorting alerts), alert priority, and the like. The user may also pre-configure the function blocks and program a control loop with the function blocks associated with the device.

The device 38 may then be attached to the industrial automation system 10 (block 104), such as by attaching the device to the H1 network 52. In some embodiments, the device 38 may have been removed from the H1 network 52, and then subsequently re-attached to the network 52. For example, if the device 38 became inoperable, the device 38 may have been removed and then replaced with a device 38 having the same model and manufacturer. In another example, the device 38 may have been inadvertently removed by collision with a forklift and then subsequently re-attached to the H1 network 52.

In one embodiment, the coupling (i.e., attaching or re-attaching) of the device to the H1 network 52 may result in an automatic commissioning of the device. That is, the configuration data entered during pre-configuration (block 102) of the device 38 may be automatically loaded into a memory of the device 38. Indeed, a "plug and play" process may automatically update the device 38 with any pre-configuration information detailed in the device placeholder (e.g., virtual device). In another embodiment, the device 38 may be attached to the H1 network 52 and the device may then be manually commissioned using, for example, a commissioning paper tag containing printed commissioning data. The commissioning tag may include information such as device ID, model type, serial number, and the like. Once attached and commissioned (block 104), the device may now be communicatively connected to all other components of the industrial control system 10.

In the depicted embodiment, the process 100 may perform an initial alert collection (block 106) to retrieve alert data from the field device 38 when the device 38 is first attached to the H1 network 52 and commissioned. For example, the controller's Fieldbus process 90 may interact with the field device 38 via the linking device 46 to request alert data, as described in more detail below with respect to FIG. 5. The initial alert collection (block 106) may include retrieving all current alarms and events associated with the field device 38. For example, diagnostic alerts, such as alerts requesting recalibration of the field device 38, may be provided to the controller 26. The alerts may then be transitioned (e.g., provided) to the alarm server 70 (block 108) in a protocol understandable by the alarm server, as described in more detail below with respect to FIG. 4, and then further provided to other entities of the system 10 (block 110), such as the alarm viewers 80 and redundant controllers 26. The transitioning may include, for example, translating alarm information in one protocol (e.g., Foundation protocol), into alarm information in a different protocol (e.g., SDI protocol).

The process 100 may then monitor the field and linking device for new alerts (block 112). In one embodiment, monitoring for new alerts (block 112) may include listening for multicast broadcasts issued by the field devices, e.g., devices 38, 40, 42, and 44, and linking devices, e.g., linking devices 46 and 48. All alerts related to the multicast broadcasts may then be subsequently transitioned to the alarm server 70 (block 108) for subsequent processing and delivery to the interested entities (block 110). By transitioning the alerts into a common protocol understandable by the alarm server 70, the systems and processes described herein enable a variety of devices to participate in sending and receiving alert information. In this manner, a more efficient and resilient alerting system is provided.

FIG. 4 is an information flow diagram 114 illustrating an embodiment of information flows between the Fieldbus process 90 and the alarm process 91 depicted in FIG. 2. The Fieldbus process 90 and its various components may be implemented as executable code instructions stored on a nontransitory tangible machine-readable medium, e.g., the volatile and non-volatile memory 86 of the controller 26. Likewise, the alarm process 91 and its various components may be implemented as executable code instructions stored on a nontransitory tangible machine-readable medium, e.g., the volatile and non-volatile memory 86 of the controller 26. The depicted information flow may be suitable for transitioning alerts from the field devices 38, 40, 42, and 44 to the alarm server 70 and redundant controller 27. That is, alerts from the field devices, 38, 40, 42, and 44 may be received and processed by the processes 90 and 91, and then provided to any number of entities of the industrial control system 10 (e.g., alarm server 70 and redundant controller 27) in the entities' preferred protocol.

In the depicted embodiment, the Fieldbus process 90 and the alarm process 91 are used to transition alerts to the alarm server 70 and the redundant controller 27. Specifically, the Fieldbus process 90 may "listen" for alerts issuing out of field devices 38, 40, 42, and 44, acknowledge the alerts, and transition the alert information to the alarm process 91. The alarm process 91 may then communicate with the alarm server 70 in a suitable protocol (e.g., SDI) and transmit the Fieldbus alert information. By enabling the translation of alert information issued in one protocol (e.g., Fieldbus protocol) into the alarm server 70 in a second protocol (e.g., SDI), the systems and processes described herein provide for enhance alert compatibility and transmission of a variety of alert information.

In one embodiment, a field device, such as the field device 38, may issue an event or alarm multicast broadcast 116 to notify the system 10 of an alert condition (i.e., an event, an alarm, or a combination thereof). As depicted, the Fieldbus process 90 may receive the multicast broadcast 116 issuing out of the I/O Net 50. For example, the field device 38 may issue the event or alarm multicast broadcast 116, which may then be transmitted though the I/O Net 50 by the linking device 48 shown in FIGS. 1 and 2. In one embodiment, the multicast broadcast 116 may be received by an HSE stack 118 monitoring I/O Net 50 HSE ports. A receive thread 120 executing in the Fieldbus process 90 may continuously check for multicast broadcasts 116 received by the HSE stack 118. Upon receipt of the multicast broadcast 116 by the HSE stack 118, the receive thread 120 may package alert information related to the multicast broadcast 116 into a Fieldbus Foundation (FF) alert transition 122 and transfer the FF alert transition 122 into a FF alert transition queue 124. Additionally, the receive thread 120 may notify an alarm thread 126 of the receipt and transfer of the FF alert transition 122. The FF alert transition 122 may include the multicasted event or alarm broadcast 116, as well as all alert information related to the multicast broadcast 116. For example, the FF alert transition 122 may include undefined alerts, low limit alarms (LO), high limit alarms (HI), critical low limit alarms (LO LO), critical high limit alarms (HI HI), deviation low alarms (DV LO), deviation high alarms (DV HI), discrete alarms (DISC), block alarms (BLOCK), write protect changed alarm (WRITE), static data update event, link associated with function block update event, trend associated with block update event, ignore bit string update event (IGNORE), integrator reset update event (RESET), and any other related information, such as user pre-configuration information.

The alarm thread 126 may then retrieve the FF alert transition 122 from the queue 124 for further transmittal, such as for transmitting the FF alert transition 122 to the alarm process 91 and for confirmation of receipt of the multicast broadcast 116. For example, the alarm thread 126 may issue a FF alert transition confirmation 128 by using a send thread 130. The send thread 130 may dispose the FF alert transition confirmation 128 in the HSE stack 118, which may then be received by the field device 38 that issued the multicast broadcast 116. A confirmation 132 of receipt of the FF alert transition confirmation 128 may then be issued by the device 38. Indeed, receipt of the alert transition confirmation 128 by the alert issuing device 38 may be confirmed by issuing the confirmation 132. The confirmation 132 may be retrieved from the HSE stack 118 by the receive thread 120 and forwarded to the alarm thread 126. In this manner, the alarm thread 126 is notified for the receipt of the initial FF alert transition confirmation 128 by the alert issuing device 38.

Next, as shown in FIG. 4, the alarm thread 126 may then transmit confirmed FF alert transitions 134 to the alarm process 91 by using a FF alarm client 136. For example, the FF alarm client 136 may communicate with a FF handler thread 138 included in the alarm process 91 to deliver the confirmed FF alert transitions 134. The FF handler thread 138 may then store the confirmed FF alert transitions 134 in a FF alert transition buffer 140. In this manner, multiple FF alert transitions 134 may be buffered for more efficient processing.

After storing the confirmed FF alert transitions 134 in the buffer 140, an alarm manager thread 142 may then retrieve the FF alert transition 134 from the buffer 140 for further data processing and storage. For example, the information included in the FF alert transition 134 may be stored in an alarm data manager 144 as a FF alert transition object 146. In certain embodiments, the alarm data manager 144 may be a multi-dimensional data warehouse or any other suitable data store (e.g., relational database, network database, binary file). The alarm data manager 144 may not only store FF alert transition objects 146, but may also store alert information issued through the I/O packs 60 shown in FIGS. 1 and 2. Indeed, the alarm data manager 144 may store and manage alerts associated with a variety of alert systems and protocols, including Fieldbus Foundation, SDI, Profibus, and HART systems and protocols.

Once the FF alert transition object 146 is stored in the alarm data manager 144, the alarm manager thread 142 may then transmit the FF alert transition object 146 to other entities of the system 10. For example, a transmit thread 148 may transmit the FF alert transition object 146 to the redundant controller 27. As mentioned above, some embodiments may include two or more controllers, such as the controllers 26 and 27, to provide fault tolerance and redundancy. In certain embodiments, the controllers 26 and 27 may be communicatively coupled in a client/server relationship. This client/ server relationship advantageously enables a controller 26 (i.e., a server controller) executing the alarm process 91 to manage and control alert information as a single "owner" of the information. The server controller 26 may then disseminate the alert information to a client controller, such as the depicted redundant controller 27 (i.e., a client controller). One of the client controllers 27 may then take over the server role should the server controller 26 become otherwise inoperative. By providing alert information to multiple controllers, redundant and fault tolerant alert operations are enabled.

Additionally, the transmit thread 148 may transmit the FF alert transition object 146 to the alarm server 70 for further alert processing and distribution. The alarm server 70 may use a different communication protocol, such as the SDI protocol. Accordingly, the transmit thread 148 may transfer the FF alert transition object 146 by using the protocol supported by the alarm server 70. A variety of protocols may be supported suitable for communication with various alarm servers 70. For example, the system 10 may use the transmission control protocol/internet protocol (TCP/IP), user datagram protocol (UDP), hypertext transfer protocol (HTTP), institute of electrical and electronics engineers (IEEE) 802.11 (e.g., IEEE 802.11a/b/g/n), ZIGBEE® protocol, and Z-WAVE®. The alarm server 70 may then distribute alarms to the alarm viewers 80 depicted in FIG. 2. Advantageously, the information flow described with respect to FIG. 4 may also be used to remove alert information from a device that has recently been detached to the I/O Net 50, as depicted in FIG. 5.

Figure 5:
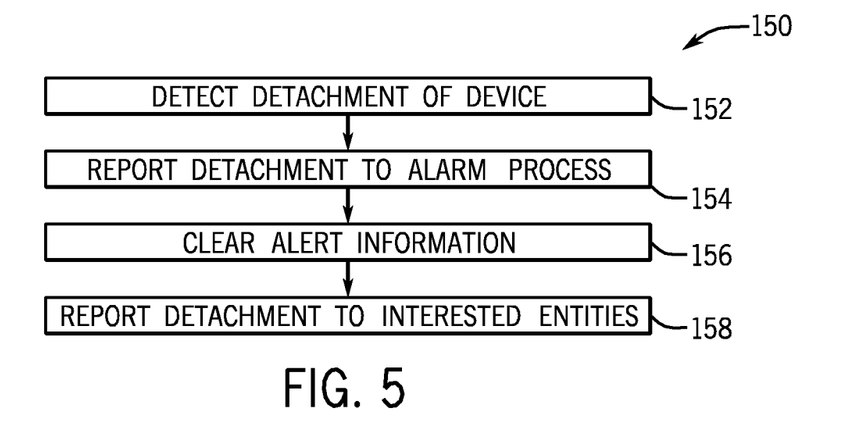
FIG. 5 is a flow chart of an embodiment of a process suitable for removing alert information from a device that has been detached from the industrial control system of FIG. 1.

FIG. 5 depicts an embodiment of a process 150 for removing and distributing alert information from a field device that has been recently detached from the system 10 shown in FIG. 1. The process 150 may be implemented as executable code instructions stored on a non-transitory tangible computer-readable medium, such the memory 86 of the controller 26, the memory 86 of the controller 27, and the memory 72 of the alarm server 70. As mentioned above, a field device, such as the device 38 shown in FIGS. 1-3, may be removed from the H1 network 52. The device 38 may be inadvertently removed or may be intentionally removed for replacement, repair, or for any other purpose. The process 150 may detect the detachment of the device from the H1 network 52 (block 152). In one embodiment, the linking device 46 may periodically issue a pass token, by using the Fieldbus Foundation protocol, to each of the field devices 38, 40, 42, and 44. The disconnected device 38 will not respond to the pass token in the allocated time, resulting in detection of the disconnected device 38. In this manner, the detachment of the device 38 may be detected (block 152). In another embodiment, the linking device 46 or the controller 26 may query the device 38 for a status. Non-responsive behavior by the device 38 may then result in removing the device 38 from the live list 63. In yet another embodiment, the user may manually update the status of the device to reflect the change in status to a detached status.

The process 150 may then report the detachment of the device 38 to the alarm process 91 (block 154) shown in FIG. 2. As mentioned above, the alarm process 91 may be used as a centralized source for alert information. That is, other entities of the system 10, such as the alarm viewers 36 and the redundant controller 27, may interact with the alarm process 91 to receive and forward information related to any alerts issued by the device 38. By centralizing the alert information in the alarm process 91, updates to the alert information may be made efficiently and may be reflected more quickly. Subsequently, the alert information for the detached device 38 may be removed or cleared (block 156). For example, the alarm process 91 may remove all alarms and events information associated with the device 38 from the alarm data manager 144 shown in FIG. 4.

The process 150 may then report the detachment of the device 38 to other entities of the system 10. For example, the alarm viewers 36 and the redundant controller 27 shown in FIG. 4 may both be notified of the removal of the device 38. In one embodiment, the alarm process 91 may communicate with the alarm viewers 36 by using the SDI protocol to inform the alarm viewers 36 of the removal of alarms and events due to disconnection of the device 38. Likewise, the alarm process 91 may communicate with the controller 27 over the unit data highway 24 to also inform the controller 27 of the removal of the device 38. Additionally, any queries from entities soliciting alarm and event information related to the detached device 38 may now be notified that the device 38 is no longer attached to the system 10. In this manner, alarm and event information may be consistently maintained throughout the system 10 when a device is removed from the system 10. Additionally, as mentioned above with respect to FIG. 3, if the device 38 is reattached to the H1 network 52, then the systems and processes described herein may automatically collect alert information and provide the alert information to the interested entities (e.g., alarm viewers 36 and redundant controller 27).

Technical effects of the invention include maintaining consistent alert information when a device is removed from an industrial control system. Once the device is removed, any corresponding alert information may also be automatically removed or updated to reflect that the device is no longer present. Such a "plug and play" approach enables clients to be notified once the field device is removed from the industrial automation system. Further, this "plug and play" approach may minimize or eliminate human involvement during the removal of alert information related to the detached device. Further technical effects include the harvesting of alert information from field devices that have been re-attached to the industrial control system. For example, the technical effects include receiving and translating alert information from a first protocol (e.g., Fieldbus protocol) into one a second protocol (e.g., SDI) when the field device is re-attached to the industrial control system. Such a "plug and play" approach enables alert information to be gathered from field devices and provided to controllers and to alert clients once the field device is physically attached to the industrial automation system, thus minimizing or eliminating human involvement. Likewise the "plug and play" approach enables alert information to be cleared once the field devices are removed from the industrial control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial process control system comprising:
   a controller configured to couple to a field device;
   an alert server configured to couple to the controller, wherein the alert server is physically detached from the controller; and a live list, wherein the controller is configured to query the live list to detect the removal of the field device,
wherein the controller is configured to detect, via a first protocol, removal of the field device and to communicate, in a second protocol, the removal of the field device to the alert server, wherein the controller is configured to communicate the removal of the field device by transmitting to the alert server a message informing of the removal of the field device, wherein the alert server is configured to update an alarm process having a centralized repository of alarm information, the removal of the field device upon receipt of the message, wherein the update the alarm process comprises clearing the alarm information related to the field device from the centralized repository, wherein the controller is configured to collect additional alert information from the field device upon reattachment of the field device to the industrial process control system and the controller is configured to distribute the additional alert information to the alert server, and wherein the first protocol comprises a Fieldbus Foundation protocol, a HART protocol, or a combination thereof, and wherein the controller is configured to detect the removal of the field device by issuing a pass token to the field device and then querying the field device for the pass token.

2. The system of claim 1, wherein the alert server is configured to communicate the removal of the field device to an alarm viewer, a redundant controller, or a combination thereof via the centralized repository.

3. The system of claim 1, wherein the second protocol comprises a serial data interface (SDI) protocol, a transmission control protocol/internet protocol (TCP/IP), a user datagram protocol (UDP), a hypertext transfer protocol (HTTP), an institute of electrical and electronics engineers (IEEE) 802.11 protocol, a Zigbee protocol ratified by the Zigbee Alliance, a Z-Wave protocol ratified by the Z-Wave Alliance, or a combination thereof.

4. The system of claim 1, comprising a linking device having the live list.

5. The system of claim 1, comprising the field device, wherein the field device comprises a Fieldbus Foundation device, a Profibus device, a HART device, or a combination thereof.

6. The system of claim 1, comprising the field device, wherein the field device comprises an automatically commissioned field device.

7. The system of claim 1, comprising the field device, wherein the field device comprises a manually commissioned field device.

8. The system of claim 1, comprising the field device, a linking device, a high speed Ethernet network, a unit data highway, and a Foundation H1 network, wherein the linking device is configured to link the high speed Ethernet network to the Foundation H1 network, the controller is coupled to the high speed Ethernet network and the unit data highway, the alert server is coupled to the controller through the unit data highway, and the field device is coupled to the Foundation H1 network.

9. A method, comprising:
detecting, via a controller of an industrial control system and a first protocol, a detachment of a field device, wherein the controller is configured to query a live list to detect the removal of the field device;
transmitting a message to an alarm data manager, via the controller, wherein the message comprises information relating to the detachment of the field device;
removing alert information relating to the field device from the alarm data manager, wherein the alarm data manager is configured to update an alarm process having a centralized repository of alarm information, the removal of the field device upon receipt of the message;
reporting, via the controller and a second protocol, the detachment of the field device to components of the industrial control system, wherein the alarm data manager is physically separated from the controller, wherein removing the alert information comprises clearing the alarm information related to the field device from the from the centralized repository;
collecting, via the controller, additional alert information from the field device upon reattachment of the field device to the industrial control system; and
distributing, via the controller, the additional alert information to the alert server, wherein the first protocol comprises a Fieldbus Foundation protocol, a HART protocol, or a combination thereof, and wherein the controller is configured to detect the removal of the field device by issuing a pass token to the field device and then querying the field device for the pass token.

10. The method of claim 9, wherein the second protocol comprises a serial data interface (SDI) protocol, a transmission control protocol/internet protocol (TCP/IP), a user datagram protocol (UDP), a hypertext transfer protocol (HTTP), an institute of electrical and electronics engineers (IEEE) 802.11 protocol, a Zigbee protocol ratified by the Zigbee Alliance, a Z-Wave protocol ratified by the Z-Wave Alliance, or a combination thereof.

11. The method of claim 9, wherein the querying the live list comprises querying a linking device having the live list stored thereon.

12. A non-transitory tangible computer-readable medium comprising executable code, the executable code comprising instructions for:
detecting, via a controller of an industrial control system and a first protocol, a detachment of a field device, wherein the controller is configured to query a live list to detect the removal of the field device;
transmitting a message to an alarm data manager, via the controller, wherein the message comprises information relating to the detachment of the field device;
removing alert information relating to the field device from an alarm data manager, wherein the alarm data manager is configured to update an alarm process having a centralized repository of alarm information, the removal of the field device upon receipt of the message, wherein removing the alert information comprises clearing the alarm information related to the field device from the from the centralized repository;
reporting, via the controller and a second protocol, the detachment of the field device to components of the industrial control system, wherein the alarm data manager is physically separated from the controller;
collecting, via the controller, additional alert information from the field device upon reattachment of the field device to the industrial control system; and
distributing, via the controller, the additional alert information to the alert data manager, wherein the first protocol comprises a Fieldbus Foundation protocol, a HART protocol, or a combination thereof, and wherein the controller is configured to detect the removal of the field device by issuing a pass token to the field device and then querying the field device for the pass token.

13. The non-transitory tangible computer-readable medium of claim 12, wherein the second protocol comprises a serial data interface (SDI) protocol, a transmission control protocol/internet protocol (TCP/IP), a user datagram protocol (UDP), a hypertext transfer protocol (HTTP), an institute of electrical and electronics engineers (IEEE) 802.11 protocol, a Zigbee protocol ratified by the Zigbee Alliance, a Z-Wave protocol ratified by the Z-Wave Alliance, or a combination thereof.

* * * * *